2,785,029

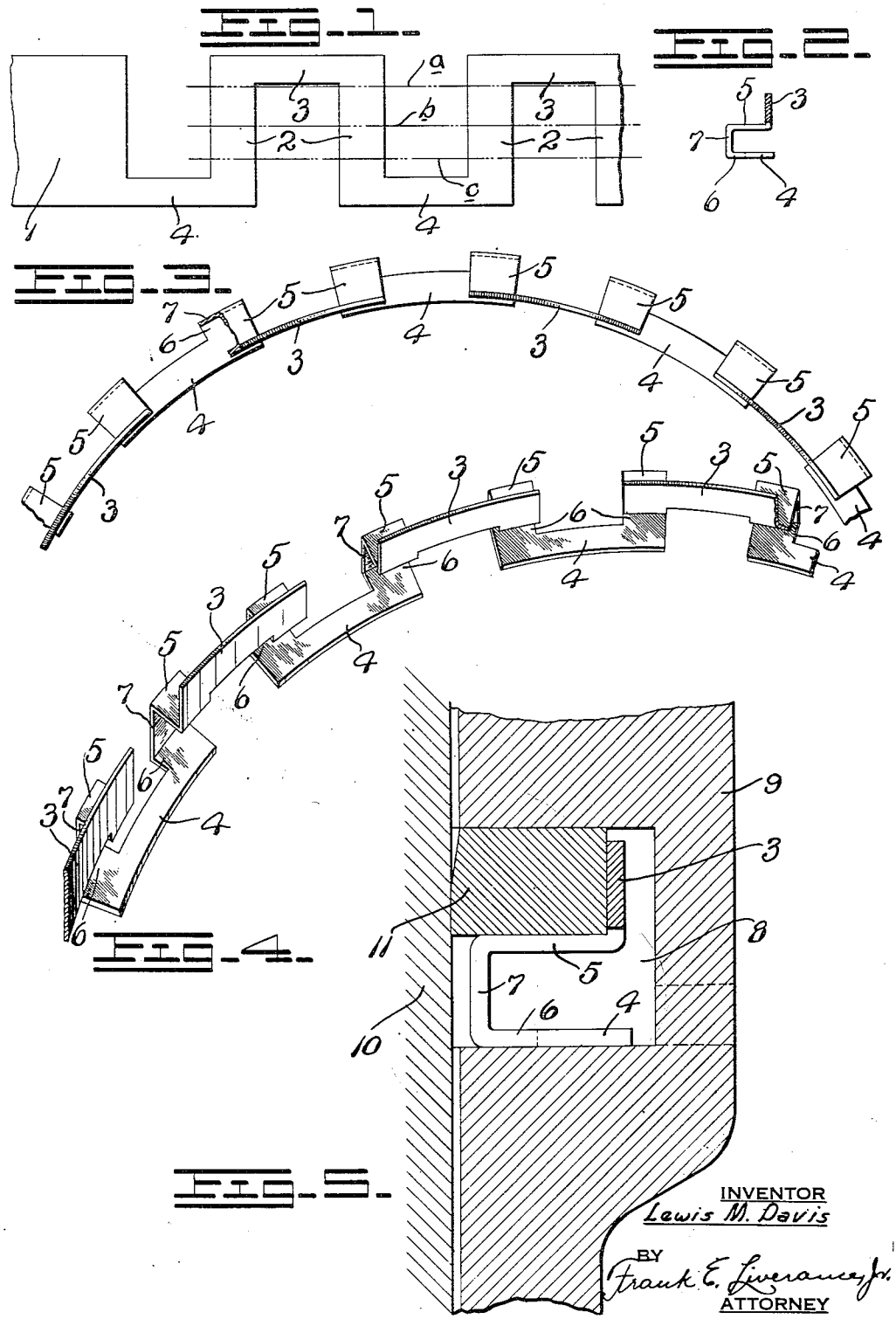
March 12, 1957 L. M. DAVIS 2,785,029
COMBINATION PISTON RING EXPANDER, SIDE
PRESSURE SPRING AND OIL VENTILATOR
Filed Aug. 23, 1954
INVENTOR
Lewis M. Davis
BY
Frank E. Liverance Jr.
ATTORNEY United States Patent Office 2,785,029
Patented Mar. 12, 1957

COMBINATION PISTON RING EXPANDER, SIDE PRESSURE SPRING AND OIL VENTILATOR

Lewis M. Davis, Muskegon, Mich., assignor to Sealed Power Corporation, Muskegon, Mich., a corporation of Michigan Application August 23, 1954, Serial No. 451,491

1 Claim. (Cl. 309—45)

The present invention has for a primary object and purpose the production of a combined expander, side pressure spring and oil ventilator which may be used with a plain unvented compression ring in a lower oil groove of a piston for the conserving and salvaging lubricating oil in engines. A further object of the invention is to support the conventional compression ring by the combined compression expander, spring and ventilator of my invention with force enough that it at all times tends to hold such ring snugly against the upper side of the groove but with a yielding pressure and one of limited amount insufficient to keep the ring from its necessary radial movements which it must have to maintain a seal against the cylinder bore.

A further object of my invention is to provide a device of the character stated which is readily manufactured, economical to produce, easily installed and effective in service, being sturdy and durable and not liable to breakage or other damage.

An understanding of the invention may be had from the following description, taken in connection with the accompanying drawing, in which, Fig. 1 is a plan view of a section of a length of thin ribbon material from which the device is made illustrating the first step of procedure in its manufacture.

Fig. 2 is a transverse section through the completed device after it has been shaped and formed to make the combined expander, side pressure spring and oil ventilator.

Fig. 3 is a fragmentary plan view thereof, such device being in generally circular form and parted at one side for passing over a piston, the same as in piston rings or parts associated therewith which are mounted in piston ring grooves.

Fig. 4 is a fragmentary perspective view thereof, and

Fig. 5 is an enlarged fragmentary vertical section through a piston at an oil groove therein and its associated cylinder, the assembled piston ring and the combined expander, side pressure ring and oil ventilator of my invention also being in vertical section.

Like reference characters refer to like parts in the different figures of the drawing.

In the production of my invention, thin spring ribbon metallic stock of the necessary width, as indicated at 1, is processed in a punch press, cutting alternately rectangular sections therefrom at each side edge so as to leave U-portions alternately open and closed at opposite side edges, said sections consisting of parallel legs 2 spaced from each other, closed end sections 3 at one side edge and others at 4 at the opposite side edge of the strip as in Fig. 1.

Such strip as thus processed is pressed into a cross sectional shape substantially like that shown in Fig. 2. Bent on lines of folding at a, b, and c, parallel to each other and lengthwise of the strip, they provide a plurality of spaced upwardly extending sections 3 and below them horizontal sections 4 which are connected by channel sections each having upper and lower flanges 5 and 6 and a connecting web 7. The flanges 5 extend outwardly from the lower edges and at opposite end portions of the sections 3, the flanges 6 extend outwardly from the end portions of the parts 4, and the vertical web 7 integrally connects the outer edges of the upper and lower flanges 5 and 6. The sections 3 are spaced from each other as also are the sections 4, the end portions of the upper sections 3 lying over the end portions of the lower sections 4 as best shown in Fig. 4.

The device thus produced of a generally circular form and open at its parting, the same as a piston ring, is placed in the lower portion of an oil ring groove 8 in a piston 9 which in use reciprocates within a cylinder 10. Above the upper flanges 5 a conventional type compression piston ring 11 likewise parted at one side and open at said parting when free is placed, the vertical dimension of the ring 11 being such that with its lower side in contact with the flanges 5 it is held snugly against the upper side of the groove 8, but with a pressure not so great that it prevents the ring 11 from moving outwardly to bring its outer cylinder engaging face against the wall of the cylinder. Such compression ring has tension provided in it when it is closed at its parting upon installation in an engine cylinder.

The combined expander, side pressure spring and oil ventilator likewise when closed at its parting has an expanding force generated therein which is transmitted against the inner side of the ring 11 by the vertically extending sections 3 back of it. Oil ventilation is provided by the wide open passages for oil between the adjacent ends of the spaced channel sections which are connected one with each end of each of the sections 3 and 4. It is to be understood that the sizes of the parts illustrated in the drawings are exaggerated, Fig. 5 being at a scale substantially ten times the actual sizes of such parts. The outer sides of the webs 7 are spaced inwardly from the adjacent cylinder walls at 10 and when the assembly of piston ring and the device of my invention is made in a piston groove and installed in a cylinder, the ends of such device at the parting preferably are close together but do not abut against each other. The radial pressure which such expander construction exerts is controlled by the thickness of the material used and the initial parting at its adjacent ends. In holding and supporting the upper piston ring 11 it does it both radially and axially, retards ring groove wear and helps to maintain the piston against a tilting action due to connecting rod friction and the changing angularity of the connecting rod to the vertical axis of the piston. It eliminates the provision of venting openings through either cast iron piston rings or spacers which are used in some oil rings between upper and lower steel rails, there being a greater economy in manufacture obtained.

The invention is defined in the appended claim and is to be considered comprehensive of all forms of structure coming within their scope.

I claim:

In combination with a piston having a piston ring groove therearound, of a circular, single piece member parted at one side and circumferentially compressible, located in said groove, said member having a successive series of lower flat ties in circular alignment widely spaced from each other at adjacent ends and located against the lower side of said piston ring groove, an outwardly extending flange integral with each end portion of each tie lying against the lower side of the ring groove, each flange at its outer end being continued upwardly in a generally vertical web, and thence continued inwardly in a second flange one over and extending back of each of the first flanges, and vertical times integrally connecting the inner ends of the last mentioned flanges extending across the spaces between adjacent first ties, said second mentioned flanges being located generally midway between the upper and lower sides of said piston ring groove, and a piston ring of rectangular cross section resting at its lower side on said second flanges and engaged at its inner sides by said vertical ties and at its upper side yieldingly pressed against the adjacent side of the piston ring groove.

References Cited in the file of this patent
UNITED STATES PATENTS 2,635,022     Shirk  ----------------  Apr. 14, 1953